United States Patent
Schmid et al.

(12) United States Patent Schmid et al.

(10) Patent No.: US 8,692,480 B2
(45) Date of Patent: Apr. 8, 2014

(54) POWER SUPPLY UNIT AND METHOD FOR CONTROLLING A POWER SUPPLY UNIT

(75) Inventors: Markus Schmid, Jettingen-Scheppach (DE); Thomas Antonius Duerbaum, Baiersdorf (DE); Gian Hoogzaad, Mook (NL); Peter Laro, Wijchen (NL); Johann Baptist Daniel Kuebrich, Schlüsselfeld (DE)

(73) Assignee: NXP B.V., Eindhoven (NL)

( * ) Notice: Subject to any disclaimer, the term of this patent is extended or adjusted under 35 U.S.C. 154(b) by 251 days.

(21) Appl. No.: 13/062,176

(22) PCT Filed: Sep. 4, 2009

(86) PCT No.: PCT/IB2009/053865
§ 371 (c)(1),
(2), (4) Date: Mar. 3, 2011

(87) PCT Pub. No.: WO2010/026549
PCT Pub. Date: Mar. 11, 2010

(65) Prior Publication Data
US 2011/0163695 A1    Jul. 7, 2011

(30) Foreign Application Priority Data
Sep. 5, 2008 (EP) .................................... 08163799

(51) Int. Cl.
*H02J 9/06* (2006.01)
*H02J 1/00* (2006.01)
*H05B 41/38* (2006.01)

(52) U.S. Cl.
USPC ......................................... 315/294; 315/161

(58) Field of Classification Search
USPC ......... 315/294, 195, 297, 161, 307, 308, 313, 315/317
See application file for complete search history.

(56) References Cited

U.S. PATENT DOCUMENTS

| | | |
|---|---|---|
| 5,818,670 A | 10/1998 | Ahn |
| 5,995,393 A | 11/1999 | Deierlein |
| 6,462,434 B1 * | 10/2002 | Winick et al. ................... 307/85 |
| 2002/0113494 A1 | 8/2002 | Winick et al. |
| 2002/0171295 A1 | 11/2002 | Nitta et al. |

FOREIGN PATENT DOCUMENTS

| | | |
|---|---|---|
| CN | 1139233 A | 1/1997 |
| CN | 1645707 A | 7/2005 |
| CN | 101193480 A | 6/2008 |

(Continued)

OTHER PUBLICATIONS

International Search Report and Written Opinion for Int'l. patent appln. No. PCT/IB2009/053865 (Jul. 2, 2010).

(Continued)

*Primary Examiner* — Daniel D Chang

(57) ABSTRACT

A power supply unit is provided which comprises an AC/DC conversion unit with an input to which an input voltage is coupled and an output to which a DC bus voltage is coupled. The power supply unit furthermore comprises a DC bus capacitor which is coupled to the output of the AC/DC conversion unit. The power supply unit furthermore comprises at least one sub-power supply unit receiving the DC bus voltage as input for providing at least one power supply. The power supply of the at least one sub-power supply unit or part of the load is at least reduced or switched off if the input voltage falls below a predetermined threshold value.

13 Claims, 3 Drawing Sheets

(56) References Cited

FOREIGN PATENT DOCUMENTS

| | | | |
|---|---|---|---|
| DE | 200 16 655 U1 | 2/2002 | |
| EP | 1 672 765 A1 | 6/2006 | |
| JP | 2-290123 A | 11/1990 | |
| JP | 2004-013506 A | 4/2005 | |
| KR | 2003021947 A * | 3/2003 | ............... G09G 3/28 |
| WO | 2007/015599 A1 | 2/2007 | |
| WO | 2007/089086 A1 | 8/2007 | |

OTHER PUBLICATIONS

"Linear Integrated Circuits data and applications handbook. UC1842/3/4/5 Family of Current PWM Controller Data Sheet", Linear Integrated Circuits data and Applications Handbook, pp. 4-160, Apr. 1, 1990.

* cited by examiner

POWER SUPPLY UNIT AND METHOD FOR CONTROLLING A POWER SUPPLY UNIT

FIELD OF THE INVENTION

The present invention relates to a power supply unit and method for controlling a power supply unit.

BACKGROUND OF THE INVENTION

All electronic and electric devices require a power supply which provides the required voltage and current for the electronic or electric devices to be operated. The power supply is typically connected to mains voltage. As long as the power supply is indeed coupled to the mains voltage and the mains voltage is sufficiently high, the operation of the electric or electronic device will be ensured. However, if the mains voltage fails, for example due to short mains interruptions in the electrical grid, then the electronic and electric devices will not be supplied with sufficient energy and cannot operate as required.

US 2002/0171295 A1 discloses a semiconductor integrated circuit with two power supply lines. A switch is provided for each power supply line to select one of the power lines. A power supervisory circuit monitors the voltage on a main power source. If the main power supply is operating, then the semiconductor integrated circuit will be supplied with power from the main power source. However, if the power supply from the main power source is interrupted, a backup power source will supply the required power for the semiconductor integrated circuit.

Typical electronic equipment does not have a backup power source and can therefore not operate under mains power down conditions. Nevertheless, also normal electronic equipment should survive short mains interruptions. The energy needed during these short mains interruptions will be typically provided by a large electrolytic capacitor.

FIG. 1 shows a block diagram of an electric or electronic device according to the prior art. The device comprises an AC/DC conversion unit ADC which receives the mains voltage MV as input and which is coupled at its output to a DC-bus voltage capacitor $C_0$. The capacitor $C_0$ is furthermore coupled to a subsequent system SS which supplies at its output a load L. The AC/DC conversion unit ADC e.g. performs an AC/DC conversion. To the output of the AC/DC conversion stage a bus capacitor Co is connected which forms a DC bus that supplies an output voltage Vo to the subsequent systems. The subsequent system SS can for example be implemented as a DC/DC converter. The load L can be any electric or electronic device. The capacitor $C_0$ is typically a large electrolytic capacitor providing a nearly constant output voltage $V_0$ for the subsequent system SS. The capacitor $C_0$ has to fulfill several requirements. It should be large enough to avoid a high ripple voltage. Furthermore, the capacitor must be selected appropriately to ensure the hold-up requirement of the system, i.e. a power level demanded by the load L must be available during a short failure of the mains voltage. To achieve this, the output voltage $V_0$ must remain above a specified threshold voltage for a specified period of time. Accordingly, a capacitor with a large value is provided to ensure a long hold-up time. The capacitance value of the capacitor $C_0$ must be large enough to provide power for the subsequent system which may comprise several further subsystems. However, large valued capacitors will typically have a large size even if electrolytic capacitors are used. In addition, if a large capacitor is selected when the capacitor is charged for the first time, a high in-rush current will be present, which may damage other parts of the system or disturb other electronic equipment in the neighborhood.

SUMMARY OF THE INVENTION

It is therefore an object of the invention to provide a power supply unit with a capacitor used as hold-up power supply with reduced value, size and costs.

This object is solved by a power supply unit according to claim 1 and a method for controlling a power supply unit according to claim 12.

Therefore, a power supply unit is provided which comprises an AC/DC conversion unit with an input to which an input voltage is coupled and an output to which a DC bus voltage is coupled. The power supply unit furthermore comprises a DC bus capacitor which is coupled to the output of the AC/DC conversion unit. The power supply unit furthermore comprises at least one sub-power supply unit receiving the DC bus voltage as input for providing at least one power supply. The power supply of the at least one sub-power supply unit or part of the load is at least reduced or switched off if the input voltage falls below a predetermined threshold value.

According to an aspect of the invention, the power supply unit comprises a first and at least one second sub-power supply unit which are each coupled to the DC bus voltage. The power supply unit furthermore comprises any means to deactivate part of the loads. One such a mean can be a switch which is arranged between the second sub-power supply unit and the DC bus voltage. The switch is used for disconnecting the second sub-supply unit from the DC bus voltage if the input voltage falls below a predetermined threshold value. Accordingly, not the entire power supply will be powered if the input voltage falls below a predetermined threshold value, i.e. all subsystems will be deactivated except that (those) supplying the essential loads.

According to a further aspect of the invention, one of the sub-power supply units comprises a multi-output power supply for supplying a plurality of output voltages. At least some of the plurality of output voltages are deactivated if the input voltage falls below a predetermined threshold value. With such an arrangement, it is possible to deactivate only some of the output voltages such that only part of an electronic device is not supplied with power while a further part is still supplied with power.

According to still a further aspect of the invention, at least some of the output voltages or the output power of the sub-power supply units are gradually reduced if the input voltage falls below the predetermined threshold value. Accordingly, a graceful degradation with respect to a power supply is available.

The invention also relates to a method for controlling a power supply unit having an AC/DC conversion unit coupled to an AC input voltage, and a DC bus voltage, a DC bus capacitor and at least one sub-power supply unit for providing at least one power supply. The DC-bus capacitor voltage or the AC input voltage is detected. Power supply provided by the sub-power supply unit (S1, S2, SS) is reduced or switched off when the detected the DC-bus capacitor voltage or input voltage (MV) falls below a predetermined threshold value.

The invention relates to the idea to provide a power supply unit which provides not all of subsequent systems or loads with energy in case of a mains voltage failure. In particular, only those subsystems which are considered as essential or which have a high priority will be supplied with energy from the hold-up capacitor. In other words, not the entire subsystems but merely selected certain subsystem(s) will be provided with energy from the hold-up capacitor. Therefore, as less energy is required in a hold-up case, the capacitor which must supply this energy can be reduced in its size. By means of the principles of the invention the size (value) of the dc bus capacitor can be improved in order to survive short mains interrupts. The principles of the invention can be applied to power supplies e.g. of LCD-TV, LCD-monitors or of Personal Computers.

Further aspects of the invention are defined in the dependent claims.

BRIEF DESCRIPTION OF THE DRAWINGS

The advantages and embodiments of the invention will now be described in more detail with reference to the Figures.

DETAILED DESCRIPTION OF EMBODIMENTS

In the embodiments according to the invention it is described how a short interruption of an input AC voltage or a short interruption of the mains voltage is dealt with by the power supply units according to the invention. The power supply unit according to the invention receives a mains voltage or an AC input voltage at its input terminals. The AC input voltage can be derived from a mains voltage.

Figure 1:
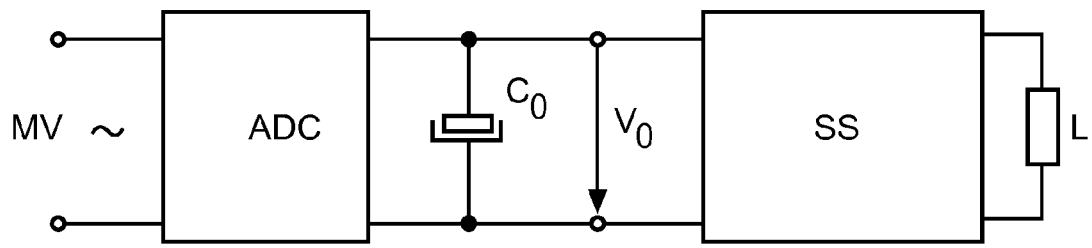
FIG. 1 shows a block diagram of a power supply unit according to the prior art.
Figure 2:
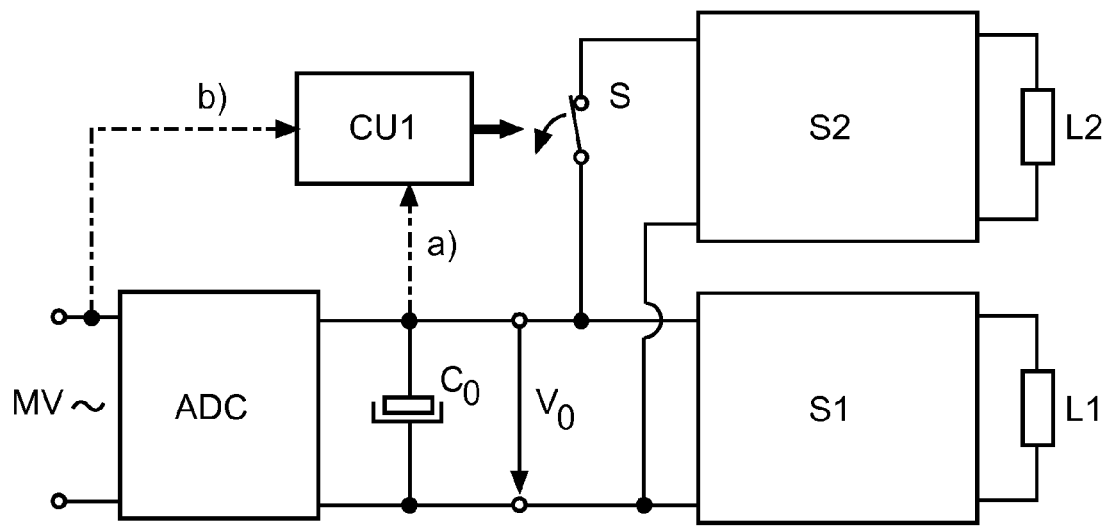
FIG. 2 shows a block diagram of a power supply unit according to a first embodiment.

FIG. 2 shows a block diagram of a power supply unit according to a first embodiment. The power supply unit comprises an AC/DC conversion unit ADC which receives an input voltage or the mains voltage MV. A first and second system S1, S2 are coupled to the AC/DC conversion stage via a DC-bus. A DC-bus capacitor $C_0$ is coupled at the output of the AC/DC conversion unit ADC. The power supply unit can optionally furthermore comprise a controller CU1 and at least one switch S (or a deactivation unit) which is coupled to the input of the second system S2. The first system S1 may constitute the power supply unit for essential units of an electronic device which may correspond to the load L1. The second system S2 may constitute a general supply unit. The first and second systems S1, S2 are coupled in parallel and are both coupled to the DC bus capacitor $C_0$. The DC-bus capacitor $C_0$ is preferably large enough to limit the voltage ripple and can also withstand the rms current. However, the size of the DC-bus capacitor $C_0$ will be optimized according to these two requirements and therefore it is typically not large enough to provide sufficient energy during hold-up for the first as well as the second system S1, S2.

If the mains voltage or AC input voltage MV drops below a threshold value such that the AC/DC conversion unit ADC and the capacitor $C_0$ will not be able to provide sufficient energy for the first system S1 as well as for the second system S2, the switch S will be opened such that only the first system will be supplied with energy from the DC bus capacitor $C_0$ which will then act as a hold-up capacitor for the load L1. The switch S can be opened immediately or after a period of time.

The optionally provided controller CU1 serves to detect a mains voltage interruption, in particular a short interruption of the mains voltage. It should be noted that this controller can also be implemented as part of a controller for the AC/DC conversion unit ADC. The controller CU1 may detect the interruption by monitoring either the voltage $V_0$ across the DC-bus capacitor or alternatively by detecting the mains voltage level. This are two methods to determine whether the voltage for the systems S1, S2 is still sufficient high.

As an alternative example, internal controllers of the first or second system S1, S2 may implement an under-voltage-lock-out feature. Here, the critical under-voltage lock-out level of the second system S2 can be adjusted just below the nominal output voltage level $V_{0,nom}$ while the critical under-voltage lock-out level of the first system S1 can be adjusted far below the output voltage level $V_{0,nom}$. Accordingly, the second system S2 which serves for a general supply will therefore be shut down at a higher voltage $V_0$ across the DC-bus capacitor $C_0$ than the first system S1 which serves as an essential supply.

Figure 3:
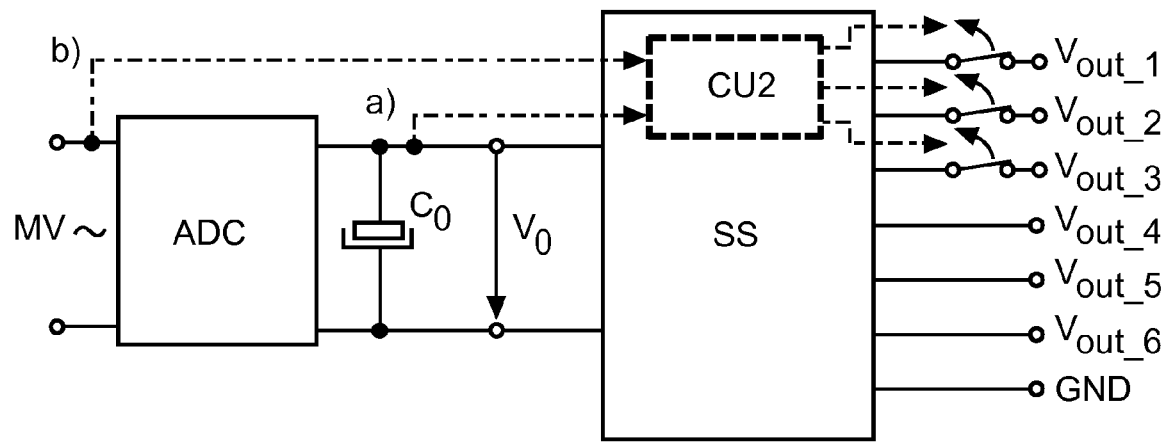
FIG. 3 shows a block diagram of a power supply unit according to a second embodiment.

FIG. 3 shows a block diagram of a power supply unit according to the second embodiment. The power supply unit comprises an AC/DC conversion unit ADC which is coupled to an AC input voltage or the mains voltage MV. The AC/DC conversion unit ADC is also coupled to a sub-power supply unit SS via the DC bus voltage $V_0$. A DC bus capacitor $C_0$ is provided between the AC/DC conversion unit ADC and the sub-power supply unit SS. Optionally, the sub-power supply unit SS may comprise a controller CU2. The power supply unit according to the second embodiment is based on the power supply unit according to the first embodiment but constitutes an alternative embodiment.

On the output side of the sub-power supply unit SS, exemplarily six output voltages $V_{out\_1}$-$V_{out\_6}$ and a ground terminal GND are provided. Accordingly, the sub-power supply unit SS may implement multi output DC/DC conversions. The output voltages of the sub-power supply unit SS may serve to supply the required voltage to several loads or applications coupled to the sub-power supply unit SS. In case of a failure of the mains voltage MV, some of the output voltages can be switched off or disconnected. Optionally, the output voltages may also be successively switched off, i.e. one after the other depending on the value of the mains voltage. The sequence of the switching off the output voltages of the sub-power unit system SS may relate to the relevance of the particular loads of applications for the overall system. In addition or alternatively, at least some of the output voltages or the output power may be reduced gradually in order to implement a graceful degradation. This can for example be performed by dimming a light or reducing the audio output power.

Figure 4:
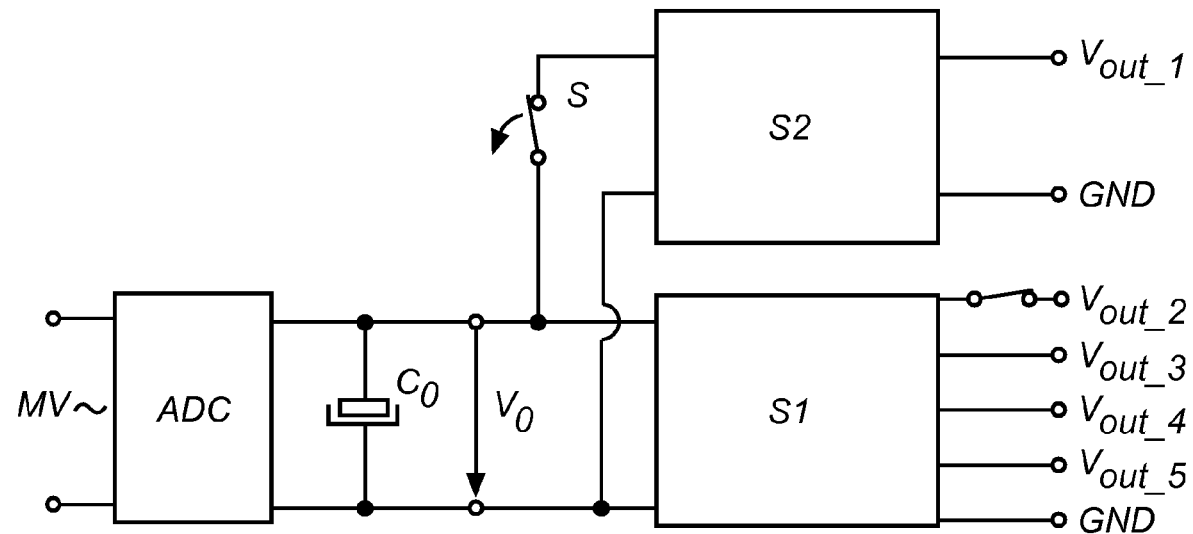
FIG. 4 shows a block diagram of a power supply unit according to a third embodiment.

FIG. 4 shows a block diagram of a power supply unit according to a third embodiment. The third embodiment is based on a combination of the first and second embodiment. The power supply unit according to the third embodiment therefore comprises an AC/DC conversion unit ADC which is coupled to the mains voltage MV, a DC-bus with a DC bus capacitor $C_0$ and a first and second system S1, S2 coupled to the DC bus. The first system S1 which serves as a power supply for the essential components of an electronic device can be implemented as a sub-power supply unit according to the second embodiment.

If the mains voltage falls below a given threshold value, the second system S2 will be disconnected via the switch S or via the under-voltage lock-out from the DC-bus voltage $V_0$, i.e. it will be shut down completely. On the other hand, the first system S1 will not be shut down but some of its output voltages may be disconnected (gradually) as described according to the second embodiment.

Figure 5:
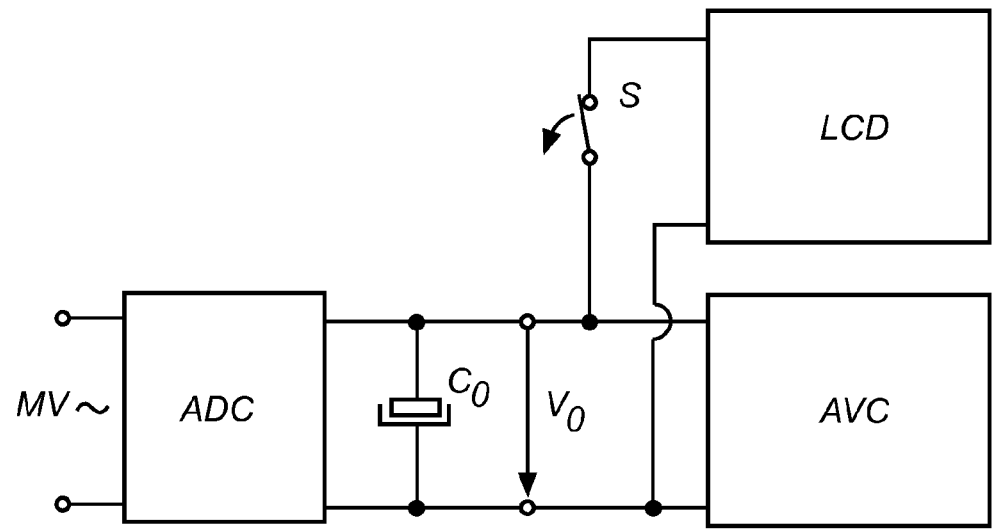
FIG. 5 shows a block diagram of an electronic device according to a fourth embodiment.

FIG. 5 shows a block diagram of a power supply unit according to a fourth embodiment. The power supply unit according to the fourth embodiment may be based on a power supply unit according to the first, second or third embodiment. Therefore, it comprises an AC/DC conversion unit ADC which receives the mains voltage MV and which is coupled to a DC bus with a DC bus capacitor $C_0$. The power supply unit according to the fourth embodiment can be used in a LCD television. As an example the LCD illumination is provided by an extra power supply unit LCD. The other functionalities like video processing, audio processing, audio power, tuner and other auxiliary functions are supplied via another power supply unit AVC. If a hold-up case occurs, the available power or energy in the DC-bus capacitor $C_0$ can be supplied to the LCD illumination unit LCD and/or to the other functions. Accordingly, the available power must be used to drive the illumination of the LCD panel or to control the audio and video processing of the TV.

For example, the power supply for the LCD illumination unit LCD can be switched off by means of the switch S. Here, the energy in the hold-up capacitor can therefore be used to drive other parts of the television. However, alternatively also other parts of the television may be switched off if the mains voltage drops below a threshold value. It should be noted that the switching off of the LCD illumination can be advantageous as the human eye will not detect a short shut down of the illumination. With the above described principles of the invention, a hold-up capacitor can be achieved which is smaller and also cheaper.

Although in the above embodiments it has been described that the power is switched off for some of the systems S2 or that some of the outputs of the sub-supply systems SS are switched off, the output voltages or the output power of the system S2 or of some outputs of the sub-power supply unit SS can also be reduced gradually. In the example of the fourth embodiment, the power for the audio speakers can be reduced for example by reducing the loudness instead of switching off the loudspeakers completely. This principle can also be applied to other functions e.g. it can be implemented by dimming some of the light sources in the TV.

In a further embodiment which can be based on the fourth embodiment, i.e. a LCD TV, the general power supply for the backlighting light sources can be switched off completely. The power supply to the audio speakers can be reduced instead of being switched off. This can for example be implemented by an electronic transformer like applications by adjusting the output voltage to the corresponding input voltage.

In a further alternative embodiment, the power supply units according to the invention can be implemented in a personal computer as its power supply. Here, the power supply of the fan of the personal computer can be switched off if the mains voltage drops below a threshold value for a short time.

Figure 6:
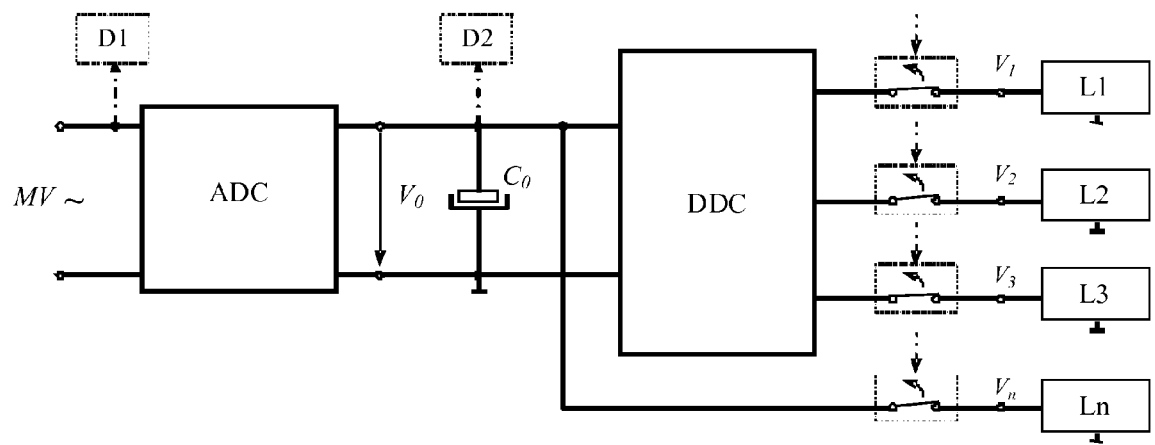
FIG. 6 shows a block diagram of a power supply according to a fifth embodiment.

FIG. 6 shows a block diagram of power supply according to a fifth embodiment. The power supply unit comprises an AC/DC conversion unit ADC which receives an input voltage or the mains voltage MV. A DC/DC conversion unit DDC is coupled to the AC/DC conversion unit ADC via a DC-bus. A DC-bus capacitor $C_0$ is coupled at the output of the AC/DC conversion unit ADC. The load L1 represents the essential load. Several other loads L2-L3 are coupled to the DC/DC conversion unit DDC via switches. Other loads like Ln can be coupled to the DC bus voltage directly if it is an essential load or otherwise via a switch. The DC/DC conversion unit DDC may be able to provide several different voltage levels as required by the loads L1-L3. The loads may be implemented as sub-power supplies or as real loads. By means of the switches the loads may be disconnected from the DC/DC conversion unit DDC or from the DC bus voltage if the voltages at the detection points D1 or D2 drop below a threshold value.

It should be noted that although in FIG. 6 the load L1 is coupled to Dc/DC conversion unit DDC via a switch, this switch can be omitted if the load L1 is an essential load which should not be disconnected is a short mains interrupt occurs.

In a further embodiment which can be based on the first, second, third or fourth embodiment, the power supply unit can communicate with at least some of the elements of the electronic device to which it is connected in order to inform the elements of the power shut down.

In a further embodiment which can be based on the previous embodiments, the elements or units of an electronic device can be associated to importance levels, wherein the essential elements or units of the electronic device have the highest importance levels. In case that the input voltage falls below a predetermined threshold value, those elements or units with a lower importance will be supplied with less power or will be switched off. The importance level can be considered as a parameter which can be stored in a controller of the system. The importance level might even change dynamically during the operation of the equipment. Optionally, a communication bus is provided such that the power supply unit can communicate to the units or elements of the electronic device which must be switched off or which power must be reduced. By means of the communication bus an early warning can be performed, i.e. a short time to e.g. save some data before the final shut down of that load can be provided.

The above described AC/DC conversion unit may comprise a power factor correction unit for correcting a power factor, e.g. by means of a passive or active switch-mode power supply like a boost, buck or buck-boost converter.

In the above embodiments mains isolation can be provided. This may be integrated into the AC/DC conversion unit, in the DC/DC conversion unit or in one of the loads.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:

1. Power supply unit, comprising:
   an AC/DC conversion unit coupled with an input to an AC input voltage and with an output to a DC-bus voltage, for converting the AC input voltage to a DC voltage
   a DC bus capacitor coupled to the DC output of the AC/DC conversion unit, and
   at least one sub-power supply unit receiving the DC bus voltage as input for providing at least one power supply,
   wherein the power supply of the at least one sub-power supply unit is at least one of reduced and switched off if the DC-bus capacitor voltage falls below a predetermined threshold value, the power supply unit further comprising a first and a second sub-power supply unit, each coupled to the DC bus voltage, wherein at least some of the sub-power supply units are switched off if the DC bus voltage falls below an under-voltage lock-out level, wherein an under-voltage lock-out level of the first sub-power supply unit is selected lower than an under-voltage lock-out level of the second sub-power supply unit.

2. Power supply unit according to claim 1, further comprising:
   a deactivation unit arranged between the second sub-power supply unit and the DC bus voltage for disconnecting the second sub-power supply unit from the DC bus voltage if the DC-bus capacitor voltage falls below the predetermined threshold value.

3. Power supply unit according to claim 1, wherein one of the sub-power supply units comprises a multi-output power supply supplying a plurality of output voltages, and
   wherein at least some of the plurality of output voltages are deactivated if the DC-bus capacitor voltage falls below the predetermined threshold value.

4. Power supply unit according to claim 3, wherein at least some of the output voltages or the output power of the sub-power supply units are gradually reduced if the DC-bus capacitor voltage falls below the predetermined threshold value.

5. Power supply unit according to claim 1, wherein the output voltages of the sub-power supply units are deactivated mechanically or electronically.

6. Power supply unit according to claim 1, further comprising a controller for controlling at least one of the switching of deactivation units and the deactivating of at least some of the output voltages of the sub-power supply unit.

7. Power supply unit according to claim 1, wherein
   at least one of the input voltage and the DC-bus capacitor voltage is monitored.

8. Power supply unit according to claim 1, further comprising:
   a communication bus, coupled to the at least one at least one sub-power supply unit and to at least one load coupled to the power supply, for communicating an early warning of at least one of a reduction and a switching-off of a power supply.

9. Electronic device comprising a power supply unit according to claim 1.

10. Liquid crystal display device, comprising a power supply unit according to claim 1.

11. Liquid crystal display device according to claim 10, wherein a power of at least one of backlight and a sound is at least reduced.

12. Method for controlling a power supply unit having an AC/DC conversion unit coupled to an AC input voltage, and a DC bus voltage, a DC bus capacitor and a first sub-power supply and a second sub-power supply unit, each coupled to the DC bus voltage for providing at least one power supply, comprising the steps of:
   detecting at least one of the DC-bus capacitor voltage and the AC input voltage,
   at least one of reducing and switching off a power supply provided by the first sub-power supply unit or the second sub-power supply unit when the detected the DC-bus capacitor voltage or input voltage falls below a predetermined threshold value, wherein at least one of reducing and switching off the power supply comprises switching off at least some of the sub-power supply units if the DC bus voltage falls below an under-voltage lock-out level, and selecting an under-voltage lock-out level of the first sub-power supply unit to be lower than an under-voltage lock-out level of the second sub-power supply unit.

13. The method of claim 12, wherein at least one of reducing and switching off the power supply comprises disconnecting the second sub-power supply unit from the DC bus voltage if the DC-bus capacitor voltage falls below the predetermined threshold value using a deactivation unit arranged between the second sub-power supply unit and the DC bus voltage.

* * * * *